June 8, 1926.

W. REMINGTON

LOGGING HOOK

Filed Dec. 15, 1925

1,587,678

WITNESSES
H. A. La Clair.
J. P. Schrott

INVENTOR
W. Remington
BY
ATTORNEYS

Patented June 8, 1926.

1,587,678

UNITED STATES PATENT OFFICE.

WILLIAM REMINGTON, OF RAYMOND, WASHINGTON.

LOGGING HOOK.

Application filed December 15, 1925. Serial No. 75,609.

This invention relates to improvements in logging hooks, and it consists of the constructions, combinations and arrangements herein described and claimed.

An object of the invention is to provide a logging hook having an independent latch which is movable into engagement with the ferrule on the free end of the choker thereby to prevent loosening of the choker from the hook while in use upon a log, there also being a spring device for holding the latch in any one of the limited positions into which it is capable of being moved.

Other objects and advantages appear in the following specification, reference being had to the accompanying drawing, in which Figure 1 is a front elevation of the hook.

Figure 1:
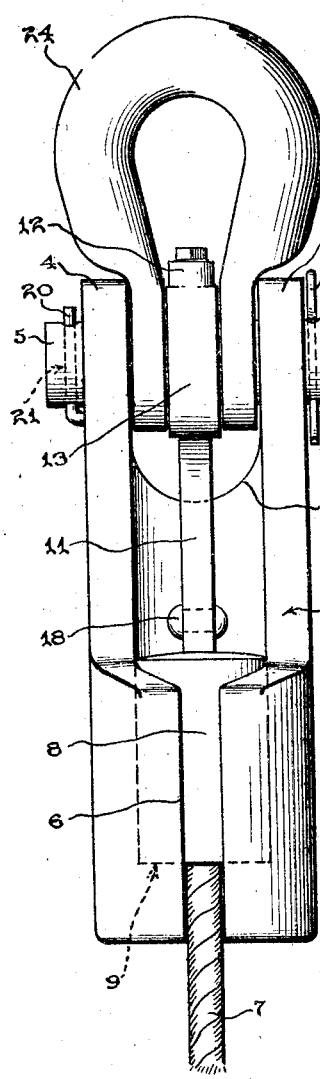
Figure 2:
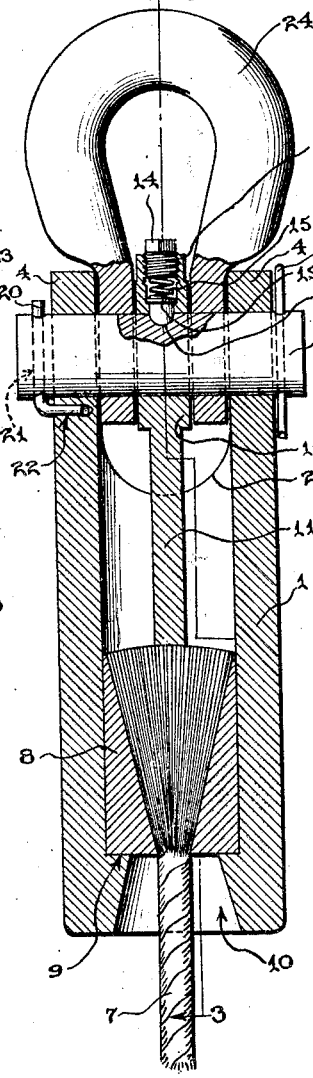
Figure 2 is a central longitudinal section, parts being shown in elevation.

The hook comprises the substantially tubular body 1 which is cut away at 2 and 3 and otherwise appropriately shaped to produce a pair of ears 4. These ears receive the pin 5 to which further reference is presently made.

A slot 6 in that part of the hook body which, for convenience, is herein known as the front, receives the choker 7 when the ferrule 8, on the free end thereof, is presented to and inserted in the opening formed by the front cut-away 3.

A shoulder 9 provides a rest for the ferrule, and the adjacent opening 10 tapers inwardly so that the choker 7 may not be restricted when partaking of the motion to which it is subject.

It is a problem in logging to keep the choker in place upon the log, particularly when slack occurs in the main or dragging line. The means herein proposed for preventing the likelihood of such happening comprises the latch 11 which is mounted upon the pin 5 and is therefore capable of swinging movement. This movement is obviously limited, as can be understood from the drawing, but is more than sufficient for the purpose of admitting the ferrule 8 in the opening at the cut-away 3. A boss 12 on the hub 13 of the latch carries a screw plug 14 which bears down upon a spring 15. This spring in turn presses against the plug 16.

A recess 17 in the side of the pin 5 receives the rounded end of the plug, the recess being in the uppermost position so that the holding function of the plug 16 occurs when the latch 11 is swung down and inwardly into engagement with the ferrule 8. The ferrule is thus held in place during all ordinary rough handling to which the hook is subjected, but the latch 11 can be pulled free of the ferrule 8 by manual effort, an appropriate grip 18, consisting of a rivet or the like, being provided in an accessible place.

A flange 19 on the plug 16 limits the inward movement of the plug and also prevents the latter from dropping through. The bore in which the plug, spring and screw plug are situated is of several diameters, principally to accommodate the two-diameter portions of the plug 16. The larger portion of the bore is internally threaded to receive the screw plug 14. The non-circular end of the screw plug is smaller than the threaded portion of the bore so that the plug 14 can be screwed down a considerable distance, if required, and thereby impose considerable pressure upon the spring. It is easily seen that when placing the spring 15 under appropriate tension it will not only hold the plug 16 in place in the recess but will also hold the latch 11 in any one of a variety of positions when swung outwardly, this by virtue of the friction of the plug 16 against the smooth side of the pin 5.

The latter function requires that the pin 5 shall be stationary. A bent wire keeper 20 fits in holes 21 and 22 respectively in the left end of the pin 5 and in the side of the hook body. This keeps the pin 5 from turning. After insertion of the pin 5 a cotter 23 inserted through the exposed right extremity keeps the pin 5 in place in the ears 4.

Use is also made of the pin 5 as a support for the clevis 24. The hub 13 of the latch 11 is situated between the ears of the clevis. The arrangement is very compact and strong, and no lost motion occurs between the parts. The clevis constitutes part of the hook, and the addition of no other links is necessary excepting those already in the chain which accompanies the device in practice.

The operation is readily understood. The choker, so-called because of the fact that it is wrapped one or more times around the log, consists of a cable to which the main or drag line is ultimately connected for the purpose of dragging the log over the ground. It is very important that the choker hook (a commonly known device) shall not come loose from the choker cable particularly when slack occurs in the main line, because then there is the likelihood of the choker falling from the log. If the latter occurrence happens upon an incline a great deal of damage can result.

In the drawing the numeral 7 represents the free end of the choker mentioned before. This end carries the ferrule 8 which is secured in place usually by babbitting. The ferrule is insertable in the opening produced by the cut-away 3 at the front of the hook body 1 and into the socket at the bottom of the hook. The socket comprises the surrounding wall of the hook body and the shoulder 9 at the extremity.

Figure 3:
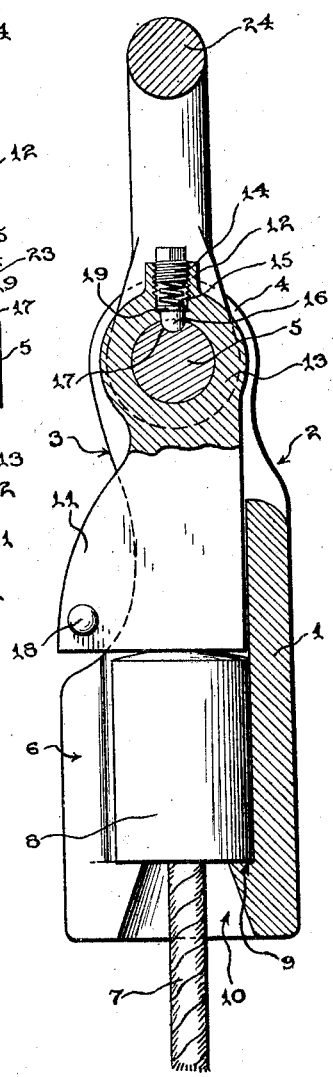
Figure 3 is a cross section taken substantially on the line 3—3 of Figure 2.

Having got the ferrule in place, the choker 7 being slipped through the slot 6, the latch 11 is swung around until it engages the end of the ferrule (Figs. 1 and 3). It must be presumed that the latch 11 was swung out at the front in order to make room for the insertion of the ferrule. In any position of the latch, the spring 15 functions to press the plug 16 against the stationary pin 5, thereby holding the latch, but in the final position of the latch, i. e. when it engages the ferrule 8 (Fig. 3) the rounded end of the plug 16 engages the recess 17 on top of the pin. This insures the retention of the latch under considerable rough handling.

Mention has been made of the body 1 being tubular. The hook is relatively long and thin, and it may be observed that such portion of the latch 11 as protrudes from the body 1 at the cut-away 3 (Fig. 3) is located substantially within the confines of the body. This circumstance obviates the likelihood of anything catching under the edge of the latch and pulling it out of the body. The straight walls of the body also reduce the friction upon the hook to a minimum. The arrangement is such that the ferrule 8 can turn freely within the body, and it makes no difference what angle or position the hook itself may assume; the safety latch 11 will prevent the ferrule from coming out.

While the construction and arrangement of the improved logging hook is that of a generally preferred form, obviously modifications and changes may be made without departing from the spirit of the invention or the scope of the claims.

I claim:—

1. A logging hook comprising a body having a formation providing a socket to receive the ferrule of a cable, a latch to engage the ferrule and prevent escape thereof from the socket, means upon which the latch can turn permitting swinging thereof into the foregoing engaging position and into a release position when the ferrule can be removed, and means including a spring plug carried by the latch having frictional engagement with said foregoing means to hold the latch in any position of adjustment.

2. A logging hook comprising a body having a formation producing a socket to receive the ferrule of a cable, a latch to engage the ferrule and prevent escape thereof from the socket, means including a pin upon which the latch can turn into the foregoing engaging position and into a release position when the ferrule can be removed, said pin having a recess, and means carried by the latch to make frictional engagement with the pin and thereby hold the latch when in the release position, said means including a rounded plug to engage the recess and positively hold the latch in said engaging position, a spring pressing on said plug, and a screw plug which bears upon the spring.

3. A logging hook having a substantially tubular body slotted and shouldered respectively to provide for admission of a cable and reception of a ferrule on the cable, there being an adjacent cut-away portion at which the ferrule enters, a latch mounted upon the hook to swing into the opening at said cut-away portion to engage the ferrule and prevent its escape from the shoulder, and means including a rivet applied to the latch so as to be accessible at said cut-away portion permitting readily pulling the latch out of engaging position preparatory to releasing the ferrule.

4. A logging hook comprising a body having a socket at one extremity and a pair of ears at the other extremity, a latch to engage a choker cable ferrule occupying the socket, a pin passing through the ears, said latch having a hub mounted upon the pin, means to hold the pin in fixed position so that the latch may turn independently thereof, and a clevis having ears disposed between the hub and the ears of the body also being mounted on the pin for movement independently of the pin, hub and ears and forming spacers to avoid lost motion between the parts.

5. A logging hook comprising a tubular body having portions cut-away at diametrically opposite sides producing a pair of ears, one of the cut-away portions being longer than the other, thereby producing an opening for the introduction of a cable ferrule, the portion of the body adjacent to the latter cut-away being slotted to admit the cable; a shoulder formed at the adjacent extremity of the body against which the ferrule rests, the adjacent end portion of the body having a tapering opening in which the cable has free movement, a pin situated in the ears, means carried by the pin engaging both the pin and an adjacent ear to prevent turning of the pin, a latch mounted upon the pin and engaging the ferrule, said latch having a portion disposed in said longer cut-away portion permitting access to the latch for swinging upon the pin, and means constituting a friction grip carried by the latch being engageable with the pin to hold the latch in various positions to which it may be adjusted when swung into and out of said opening.

WILLIAM REMINGTON.